US011325520B2

(12) United States Patent
Kawata et al.

(10) Patent No.: US 11,325,520 B2
(45) Date of Patent: May 10, 2022

(54) INFORMATION PROCESSING APPARATUS AND INFORMATION PROCESSING METHOD, AND CONTROL APPARATUS AND IMAGE PROCESSING APPARATUS

(71) Applicant: SONY CORPORATION, Tokyo (JP)

(72) Inventors: Satoshi Kawata, Kanagawa (JP); Kazunori Kamio, Kanagawa (JP); Yuki Tokizaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 16/649,205

(22) PCT Filed: Jul. 12, 2018

(86) PCT No.: PCT/JP2018/026313
§ 371 (c)(1),
(2) Date: Mar. 20, 2020

(87) PCT Pub. No.: WO2019/064825
PCT Pub. Date: Apr. 4, 2019

(65) Prior Publication Data
US 2020/0290503 A1    Sep. 17, 2020

(30) Foreign Application Priority Data

Sep. 27, 2017    (JP) .............................. JP2017-186019

(51) Int. Cl.
*B60Q 1/00*       (2006.01)
*G06T 7/521*      (2017.01)
(Continued)

(52) U.S. Cl.
CPC ........... *B60Q 1/0023* (2013.01); *B60Q 1/143* (2013.01); *B60Q 1/20* (2013.01); *G06T 7/521* (2017.01); *G06T 2207/30252* (2013.01)

(58) Field of Classification Search
CPC ........ B60Q 1/20; B60Q 1/143; B60Q 1/0023; G06T 7/521; G06T 2207/30252
See application file for complete search history.

(56) References Cited

U.S. PATENT DOCUMENTS 9,558,534 B2 *   1/2017   Higaki ................. G06K 9/4661
2010/0322478 A1  12/2010  Nitanda
(Continued)

FOREIGN PATENT DOCUMENTS

CN    102999883 A    3/2013
CN    104809707 A    7/2015
(Continued)

OTHER PUBLICATIONS

IEEE Transactions On Image Processing, vol. 24, No. 11, Nov. 2015 A Fast Single Image Haze Removal Algorithm Qingsong Zhu, Member, IEEE, Jiaming Mai, and Ling Shao, Senior Member, IEEE (Year: 2015).*

(Continued)

*Primary Examiner* — Fekadeselassie Girma
*Assistant Examiner* — Mancil Littlejohn, Jr.
(74) *Attorney, Agent, or Firm* — Paratus Law Group, PLLC

(57) ABSTRACT

A transmittance estimation unit estimates a transmittance for each of regions from a captured image. The transmittance estimation unit estimates the transmittance for each pixel, using, for example, dark channel processing. A transmittance detection unit detects a transmittance of haze at the time of imaging of the captured image, using the transmittance estimated for each pixel by the transmittance estimation unit and depth information for each pixel. The transmittance detection unit detects the transmittance of the haze on the basis of, for example, a logarithm average value of the transmittances in the whole or a predetermined portion of (Continued)

the captured image, and an average value of depths indicated by the depth information. Alternatively, the transmittance detection unit converts a grayscale of the transmittance estimated for each of the regions from the captured image into a grayscale of the depth indicated by the depth information for each of the regions and sets the transmittance after the grayscale conversion as the transmission of the haze. This enables the transmittance to be detected with high accuracy.

17 Claims, 7 Drawing Sheets

(51) Int. Cl.
 *B60Q 1/14* (2006.01)
 *B60Q 1/20* (2006.01)

(56) References Cited

U.S. PATENT DOCUMENTS

| | | | |
|---|---|---|---|
| 2012/0212477 A1* | 8/2012 | Grindstaff | G06T 5/003 345/419 |
| 2015/0371373 A1* | 12/2015 | Shin | G06T 5/007 382/274 |

FOREIGN PATENT DOCUMENTS

| | | | | |
|---|---|---|---|---|
| CN | 105427266 A | 3/2016 | | |
| CN | 106530246 A | 3/2017 | | |
| JP | 1993278519 | * 10/1993 | | Y02A 90/10 |
| JP | 2013-058203 A | 3/2013 | | |
| JP | 2015-039902 A | 3/2015 | | |

OTHER PUBLICATIONS

He et al., Single Image Haze Removal Using Dark Channel Prior, IEEE Transactions on Pattern Analysis and Machine Intelligence, Sep. 9, 2010, pp. 2341-2353, vol. 33, Issue: 12, IEEE.

Li et al., Using User Generated Online Photos to Estimate and Monitor Air Pollution in Major Cities, ICIMCS '15, Aug. 19-21, 2015, pp. 1-5, Hunan, China.

Zhu et al., A Fast Single Image Haze Removal Algorithm Using Color Attenuation Prior, IEEE Transactions on Image Processing, Nov. 11, 2015, pp. 3522-3533, IEEE.

Kim et al., Iterative Refinement of Transmission Map for Stereo Image Defogging Using a Dual Camera Sensor, Sensors, Dec. 9, 2017, pp. 1-12.

Li et al., Using User Generated Online Photos to Estimate and Monitor Air Pollution in Major Cities, ICIMCS '15, Aug. 19-21, 2015, pp. 1-5, ACM, Zhangjiajie, CN.

Kim et al., Iterative Refinement of Transmission Map for Stereo Image Defogging, 2017 IEEE International Conference on Consumer Electronics, Jan. 8-10, 2017, IEEE, Las Vegas, NV.

* cited by examiner

INFORMATION PROCESSING APPARATUS AND INFORMATION PROCESSING METHOD, AND CONTROL APPARATUS AND IMAGE PROCESSING APPARATUS

CROSS REFERENCE TO PRIOR APPLICATION

This application is a National Stage Patent Application of PCT International Patent Application No. PCT/JP2018/026313 (filed on Jul. 12, 2018) under 35 U.S.C. § 371, which claims priority to Japanese Patent Application No. 2017-186019 (filed on Sep. 27, 2017), which are all hereby incorporated by reference in their entirety.

TECHNICAL FIELD

This technology relates to an information processing apparatus and an information processing method, and a control apparatus and an image processing apparatus, and enables a transmittance to be detected with high accuracy.

BACKGROUND ART

Conventionally, for example, a method described in Non-Patent Document 1 has been known as a method for measuring a transmittance from a captured image in which visibility is impaired due to haze such as fog or dust. In Non-Patent Document 1, a density of haze is estimated, using a minimum value of R, G, and B in a local region, which is called a dark channel, and the transmittance is calculated from an estimated density of the haze. Moreover, in Patent Document 2, a transmittance is calculated by setting, as a final dark channel, a smaller one of a dark channel in each pixel and a dark channel in the local region.

CITATION LIST

Patent Document

Patent Document 1: Japanese Patent Application Laid-Open No. 2013-058203

Non-Patent Document

Non-Patent Document 1: Kaiming He, Jian Sun, Xiaoou Tang, "Single Image Haze Removal Using Dark Channel Prior", Computer Vision and Pattern Recognition, 2009. CVPR 2009. IEEE Conference on, pp. 1956-1963, 2009.

SUMMARY OF THE INVENTION

Problems to be Solved by the Invention

By the way, in each of the methods of estimating the transmittance, using the dark channel (Dark Channel Prior), it is assumed that at least one color channel in three primary color channels of the captured image has a lower intensity, and a pixel value of the darkest color channel (dark channel) is regarded as an inverted value of the transmittance. Accordingly, it is impossible to accurately measure the transmittance in a white or light gray subject region in the captured image.

Consequently, an object of this technology is to provide an information processing apparatus and an information processing method, and a control apparatus and an image processing apparatus that enables a transmittance to be detected with high accuracy.

Solutions to Problems

A first aspect of this technology is an information processing apparatus including a transmittance detection unit that detects a transmittance of haze at the time of imaging of a captured image, using a transmittance estimated for each of regions from the captured image, and depth information for each of the regions.

In this technology, an atmospheric scattering coefficient at the time of imaging is calculated on the basis of a logarithmic average value of the whole or a predetermined portion of the captured image calculated, using the transmittance estimated from the captured image, and an average of depths indicated by the depth information. Further, the transmittance of the haze is detected on the basis of the calculated atmospheric scattering coefficient and the depth information.

Alternatively, processing of converting a grayscale of each of the depths indicated by the depth information into a grayscale of the transmittance estimated from the captured image may be performed, and, for example, a histogram obtained by normalizing the depth indicated by the depth information may be caused to correspond to a histogram of the estimated transmittance, and may set the depth after the grayscale conversion may be used as the transmittance of the haze. Note that the region is a region of one pixel or a plurality of pixels provided continuously or at a predetermined pixel interval.

A second aspect of this technology is
an information processing method including
detecting a transmittance of haze at the time of imaging of a captured image, using a transmittance estimated for each of regions from the captured image, and depth information for each of the regions.

A third aspect of this technology is
a control apparatus including:
a transmittance detection unit that detects a transmittance of haze at the time of imaging of a captured image, using a transmittance estimated for each of regions from the captured image, and depth information for each of the regions; and
an operation control unit that performs operation control on the basis of the transmittance detected by the transmittance detection unit.

In this technology, using the transmittance estimated for each of the regions from the captured image and the depth information for each of the regions, the transmittance of the haze at the time of imaging of the captured image is detected, and operation control, for example, lamp drive control is performed on the basis of this transmittance. In the lamp drive control, for example, with respect to a fog lamp, lighting control and light amount control are performed on the basis of the detected transmittance, and control on at least any of an irradiation direction or an irradiation angle of the light is performed on the basis of the transmittance for each of the regions. Moreover, in the operation control based on the detected transmittance, control to output the detected transmittance to an outside is performed. Further, in the operation control, movement operation is controlled on the basis of the detected transmittance for each of the regions.

A fourth aspect of this technology is
an image processing apparatus including:
a transmittance detection unit that detects a transmittance of haze at the time of imaging of a captured image, using a transmittance estimated for each of regions from the captured image, and depth information for each of the regions; and a haze removal processing unit that generates an image with the haze removed from the captured image on the basis of the transmittance detected by the transmittance detection unit.

In this technology, an image with the haze removed is generated by adjusting contrast in accordance with a reciprocal of the transmittance of the haze at the time of imaging of the captured image, the transmittance of the haze being detected, using the transmittance estimated for each of the regions from the captured image and the depth information for each of the regions. Alternatively, an image with the haze removed is generated on the basis of a transmittance model, using the captured image and the detected transmittance.

Effects of the Invention

According to this technology, the transmittance of the haze at the time of imaging of the captured image is detected, using the transmittance estimated for each of the regions from the captured image and the depth information for each of the regions. Accordingly, the transmittance can be detected with high accuracy. Note that the effects described in the present specification are illustrative and are not limited, and may have additional effects.

MODE FOR CARRYING OUT THE INVENTION

Hereinafter, embodiments for carrying out the present technology will be described. Note that the description will be given in the following order.

1. About transmittance
2. Configuration and operation of information processing apparatus
3. Configuration and operation of control apparatus
4. Configuration and operation of image processing apparatus <1. About Transmittance>

Figure 1:
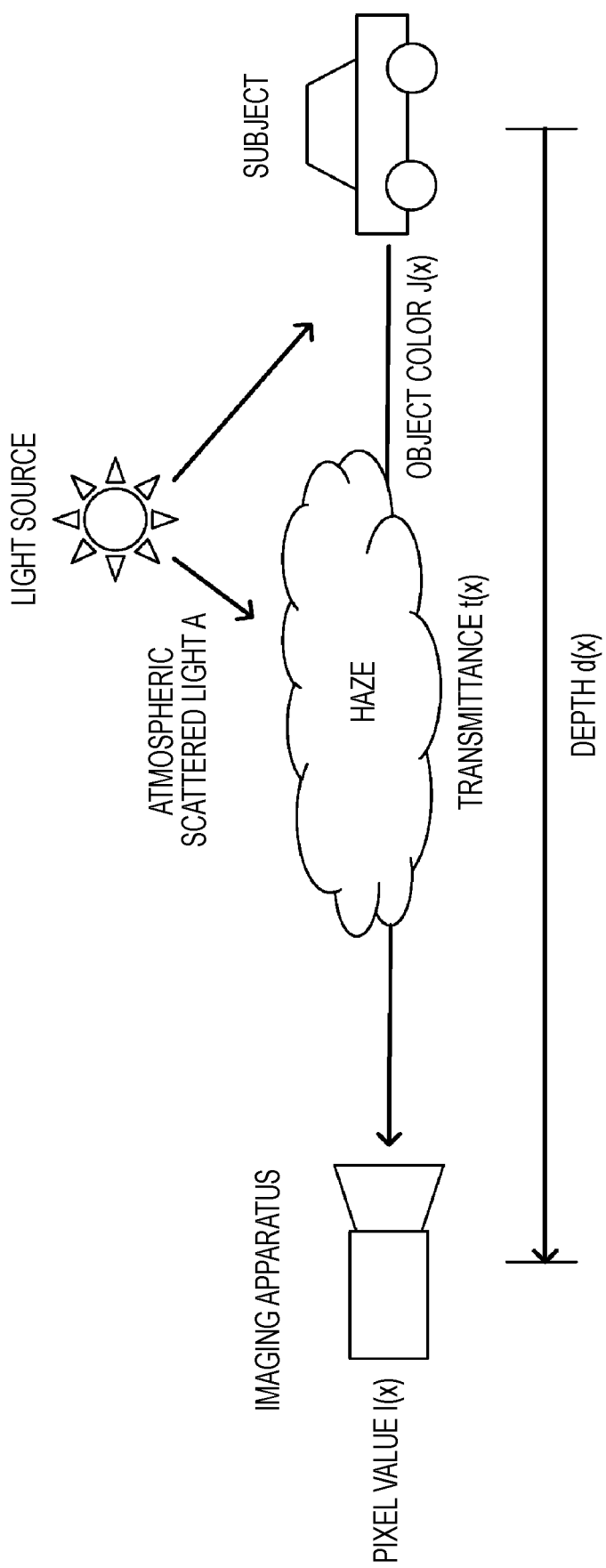
FIG. 1 is a diagram showing a model of a transmittance.

At a pixel position x of an image acquired by an imaging apparatus, if scene radiation (an original color of a subject that is not affected by haze) is J(x), ambient light (atmospheric scattered light) dispersed by the haze is A, and a transmittance of the haze is t(x), it is known that a pixel value I(x) of the image acquired by the imaging apparatus can be calculated, using an expression (1). Note that FIG. 1 shows a model of a transmittance.

$$I(x)=t(x)J(x)+(1-t(x))A \quad (1)$$

Moreover, the transmittance t(x) can be expressed by an expression (2), using a distance (depth) d(x) from the imaging apparatus to the subject and an atmospheric scattering coefficient β.

$$t(x)=\exp(-\beta d(x)) \quad (2)$$

<2. Configuration and Operation of Information Processing Apparatus>

Figure 2:
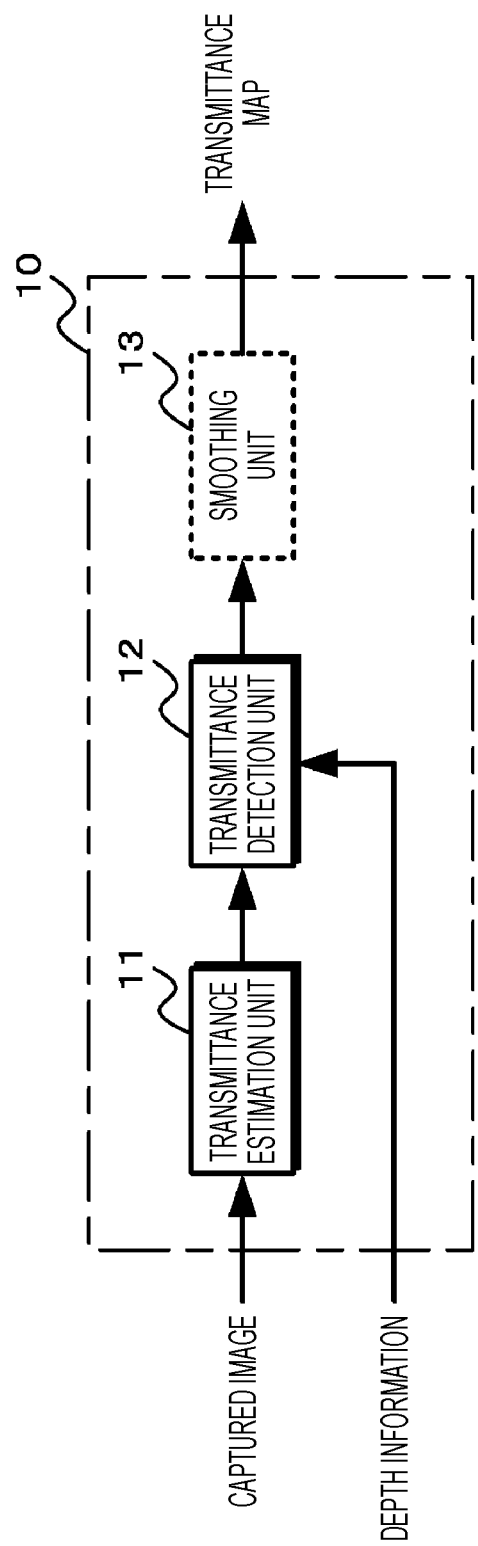
FIG. 2 is a diagram illustrating a configuration of an information processing apparatus.

FIG. 2 illustrates a configuration of the information processing apparatus of the present technology. An information processing apparatus 10 has a transmittance estimation unit 11 and a transmittance detection unit 12. The transmittance estimation unit 11 estimates the transmittance for each of regions from the captured image acquired by the imaging apparatus. The transmittance detection unit 12 detects a transmittance of haze for each of the regions at the time of imaging of the captured image, using the transmittance estimated by the transmittance estimation unit 11 and the depth information for each of the regions. The region is a region of one pixel or a plurality of pixels provided continuously or at a predetermined pixel interval, and the depth information corresponding to the region where the transmittance is estimated, or the transmittance corresponding to the region with the depth information acquired is obtained. Note that in the following description, it is assumed that the estimation of the transmittance and the acquisition of the depth information are performed for each pixel.

The transmittance estimation unit 11 estimates the transmittance for each pixel, using the method described in Non-Patent Document 1 (hereinafter, referred to as "dark channel processing"). Moreover, the transmittance estimation unit 11 may estimate the transmittance, using another generally known method such as a method described in a document "R. Fattal, "Single Image Dehazing," ACM Transactions on Graphics, 2008" and a document "R. T. Tan," Visibility in Bad Weather from a Single Image, CVPR2008".

Hereinafter, an operation in a case where a transmittance map is generated, using the dark channel processing, which is the method described in Non-Patent Document 1, will be described. In the dark channel processing, it is assumed that at least one color channel of three primary color channels has a lower intensity, and the dark channel is defined as represented by an expression (3). Note that in the expression (3), c indicates any one of RGB color components, Ω(x) indicates a local region centered on the pixel position x, and y indicates a coordinate in the local region.

[Math. 1]

$$\min_c(\min_{y\in\Omega(x)} I^c(y)) = \tilde{t}(x)\cdot\min_c(\min_{y\in\Omega(x)}(J^c(x))) + (1-\tilde{t}(x))A^c \quad (3)$$

Here, in the dark channel processing, if a pixel value of the color channel having the lowest intensity is the dark channel, and scene radiation in the dark channel is set to "0" as represented by an expression (4), the transmittance at the pixel position x can be estimated on the basis of an expression (5). Note that t with "~ (tilde)" added above is also referred to as "t~".

[Math. 2]

$$J^{dark}(x) = \min_c(\min_{y\in\Omega(x)}(J^c(y))) = 0 \quad (4)$$

$$\tilde{t}(x) = 1 - \min_c\left(\min_{y\in\Omega(x)}\left(\frac{I^c(y)}{A^c}\right)\right) \quad (5)$$

The transmittance estimation unit 11 estimates the ambient light A from a captured image acquired by the imaging apparatus, for example, a captured image configured of an image of a red component R, an image of a green component G, and an image of a blue component B. The transmittance estimation unit 11 sets, for example, a pixel having a highest luminance in the captured image as the ambient light. The transmittance estimation unit 11 performs arithmetic operation of the expression (5), using the estimated ambient light A, estimates the transmittance for each pixel, and outputs the estimated transmittance to the transmittance detection unit 12.

The transmittance detection unit 12 detects the transmittance of haze at the time of imaging of the captured image, using the transmittance estimated for each pixel by the transmittance estimation unit 11 and the depth information for each pixel, and outputs a transmittance map indicating the transmittance for each pixel. The depth information may be acquired from the imaging apparatus or may be acquired from a depth measurement apparatus. For example, in an imaging apparatus using an image sensor provided with an image plane phase difference pixel, the depth information indicating a distance to a subject can be obtained, using not only a captured image but also a pixel signal of the image plane phase difference pixel. In a case where such an imaging apparatus is used, the information processing apparatus 10 acquires the captured image and the depth information corresponding to the captured image from the imaging apparatus. Moreover, the depth information may be acquired, using a time-of-flight (TOF) sensor, a light detection and ranging/laser imaging detection and ranging (LIDAR) sensor, or the like as the depth measurement apparatus. While the depth information indicates the distance to the subject with high accuracy, for example, even if the distance is the same, the transmittance varies, depending on a state of the atmosphere from the imaging apparatus to the subject. Consequently, using the estimated transmittance and the depth information allows the transmittance detection unit 12 to detect the transmittance of haze more accurately than the estimated transmittance.

Next, a first transmittance detection operation performed by the transmittance detection unit 12 will be described. The transmittance detection unit 12 detects the transmittance of the haze on the basis of a logarithm average value of the transmittance estimated for each pixel from the captured image, and an average value of the depths for respective pixels indicated by the depth information. For example, the transmittance detection unit 12 calculates a scattering coefficient, using the estimated transmittance and the average value of the depths indicated by the depth information. Since a relationship among an estimated transmittance $t\tilde{}(x)$, the depth $d(x)$, and the atmospheric scattering coefficient $\beta$ is a relationship indicated by the expression (2) described above, an expression for calculating the scattering coefficient $\beta$ is an expression (6).

$$\beta = -(\log(t\tilde{}(x))/d(x)) \quad (6)$$

Accordingly, the transmittance detection unit 12 calculates an average value $E[\log(t\tilde{}(x))]$ of the logarithms of the transmittance $t\tilde{}(x)$ and an average value of the depths $E[d(x)]$ from the transmittance $t(x)$ and the depth $d(x)$ for each pixel, and a scattering coefficient $\beta_a$ is calculated on the basis of an expression (7). Further, the transmittance detection unit 12 detects the transmittance of the haze on the basis of the atmospheric scattering coefficient and the depth information. The transmittance detection unit 12 performs arithmetic operation of an expression (8) for each pixel, using the calculated scattering coefficient $\beta_a$ and the depth $d(x)$ to detect a transmittance $t_a(x)$, and to generate the transmittance map indicating the transmittance of the haze for each pixel.

$$\beta_a = -(E[\log(t\tilde{}(x))]/E[d(x)]) \quad (7)$$

$$t_a(x) = \exp(-\beta_a d(x)) \quad (8)$$

The transmittance detection unit 12 may use all the transmittances and the depths of the respective pixels of the captured image in calculating the average values of the estimated transmittances and the depths indicated by the depth information, or may use the transmittances and the depths of the respective pixels at a predetermined portion of the captured image, for example, at a central portion thereof. Moreover, the transmittances and the depths of pixels extracted at a pixel interval specified in advance may be used. Note that the pixel interval specified in advance may be an equal pixel interval in the entire captured image, or the pixel interval may be adjusted in accordance with the position in the image to make the pixel interval in the central portion narrower than that in a peripheral portion.

Next, a second transmittance detection operation performed by the transmittance detection unit 12 will be described. The transmittance detection unit 12 detects the transmittance of the haze by performing grayscale conversion that causes a grayscale of the depth indicated by the depth information to correspond to a grayscale of the estimated transmittance. For example, the transmittance detection unit 12 normalizes the depth indicated by the depth information, and performs grayscale conversion that causes the grayscale of the depth after the normalization to correspond to the grayscale of the estimated transmittance to set the depth after the grayscale conversion as the transmittance of the haze. That is, the transmittance detection unit 12 normalizes a depth map, performs the grayscale conversion in accordance with the estimated transmittance, and generates the transmittance map indicating the transmittance of the haze for each pixel.

In the grayscale conversion, the histogram is equalized or the like, and the histogram of the depth after the normalization is caused to correspond to the histogram of the estimated transmittance. For example, in the grayscale conversion, numbers of bins are equalized between the histogram of the depth after the normalization and the histogram of the transmittance, and the conversion of the depth is performed so that bin positions where frequencies are peak, frequencies of the peak positions and the peak positions, or a histogram shape become equal.

Figure 3:
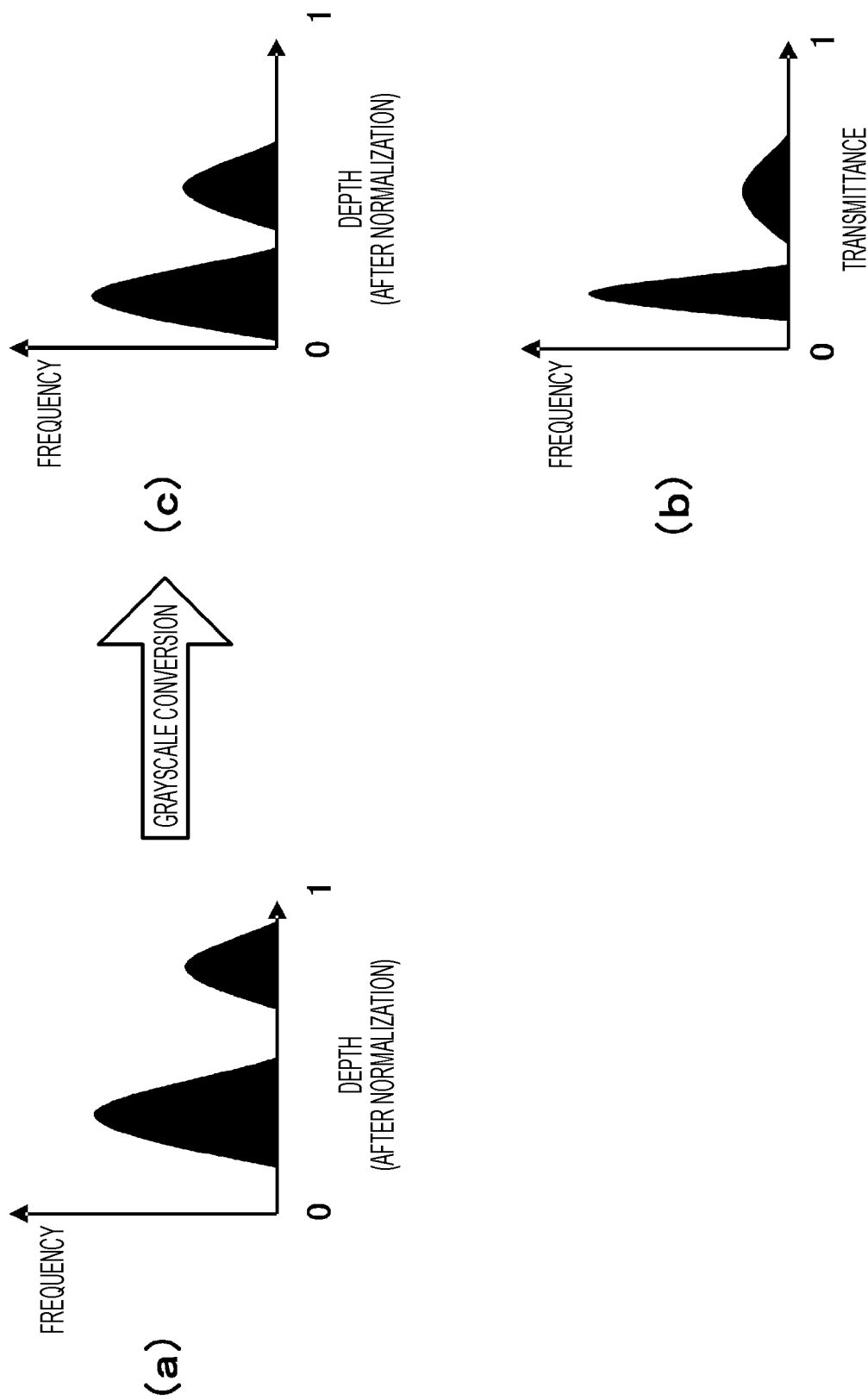
FIG. 3 is a diagram illustrating grayscale processing.

FIG. 3 illustrates grayscale processing. (a) of FIG. 3 is the histogram of the depth normalized with a predetermined distance set to "1". Note that the predetermined distance is, for example, a maximum value of the depth in each pixel indicated by the depth information. (b) of FIG. 3 is the histogram of the estimated transmittance. The transmittance detection unit 12 performs the grayscale processing so that, for example, the peak position of the histogram of the depth histogram shown in (a) of FIG. 3 corresponds to the histogram of the estimated transmittance shown in (b) of FIG. 3, and the depth indicating the histogram shown in (c) of FIG. 3 is set as the transmittance of the haze.

Note that as in the first transmittance detection operation, pixels of the entire captured image, or pixels in a partial region, for example, in the central portion of the captured image may be used as the pixels used in the second transmittance detection operation. Alternatively, pixels that have been obtained at a pixel interval specified in advance may be used. Note that the pixel interval specified in advance may be an equal pixel interval in the entire captured image, or the pixel interval may be adjusted in accordance with the position in the image to make the pixel interval in the central portion narrower than that in a peripheral portion.

As described above, according to the information processing apparatus of the present technology, since the transmittance is detected for each of the regions on the basis of the transmittance estimated for each of the regions on the basis of the captured image, and the depth information for each of the regions, the transmittance can be detected with higher accuracy, as compared with the transmittance estimated on the basis of the captured image.

Moreover, in the information processing apparatus of the present technology, a smoothing unit 13 may be provided. For example, in a case where there is a large error between a subject position indicated by the pixel whose transmittance is estimated and a measurement position of the depth indicated by the depth information corresponding to this pixel, or in a case where the transmittance is calculated in units of local regions and a change in transmittance is remarkable at a boundary of the local region, if haze removal processing is performed on the basis of a detected transmittance as described later, there is a possibility that a halo effect occurs at an edge portion of the subject or the boundary of the local region. Accordingly, the transmittance change at a boundary portion may be smoothed by providing the smoothing unit 13 and performing soft matting processing or the like.

<3. Configuration and Operation of Control Apparatus>

Figure 4:
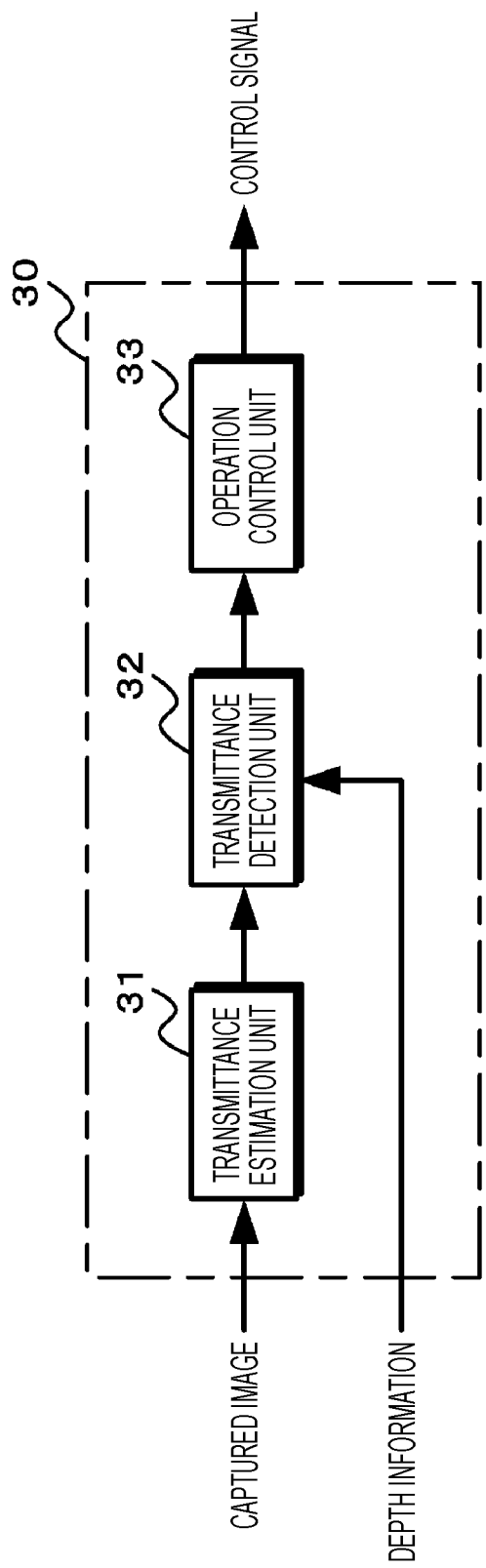
FIG. 4 is a diagram showing a configuration of a control apparatus.

Next, the control apparatus of the present technology will be described. FIG. 4 shows a configuration of the control apparatus. A control apparatus 30 has a transmittance estimation unit 31, a transmittance detection unit 32, and an operation control unit 33.

The transmittance estimation unit 31 performs similar processing to the above-described transmittance estimation unit 11 to estimate the transmittance, for example, for each pixel from the captured image, and to output the estimated transmittance to the transmittance detection unit 32. The transmittance detection unit 32 performs processing similar to the above-described transmittance detection unit 12, detects the transmittance of the haze at the time of imaging of the captured image, using the transmittance estimated by the transmittance estimation unit 31 and, for example, the depth information for each pixel, and outputs the transmittance map indicating the transmittance for each pixel to the operation control unit 33. The operation control unit 33 determines presence or absence of the haze on the basis of the transmittance map output from the transmittance detection unit 32. Moreover, the operation control unit 33 controls an operation of a controlled unit on the basis of a determination result of the presence or absence of the haze and the transmittance for each of the regions. Next, a vehicle control system using the control apparatus will be described.

Figure 5:
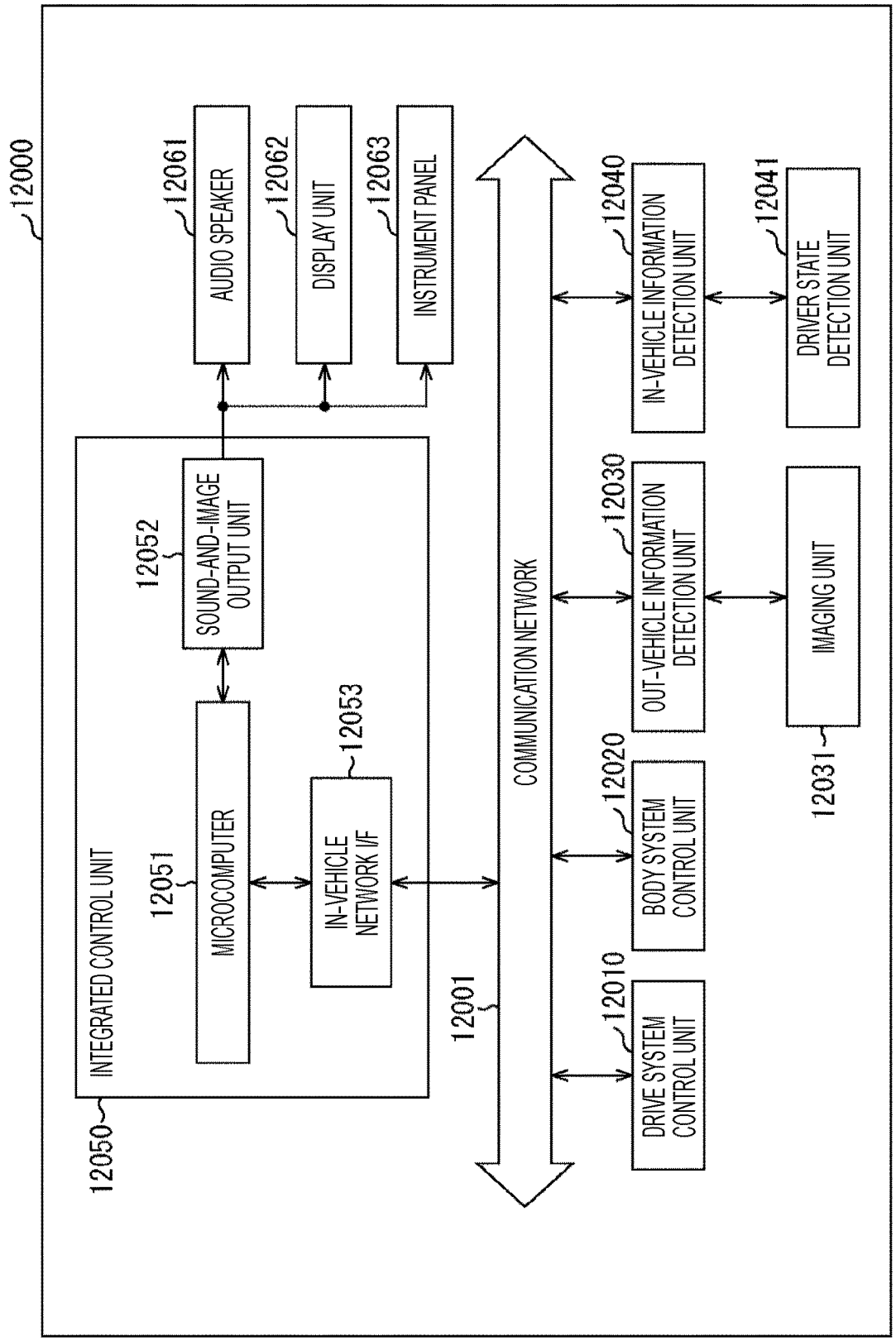
FIG. 5 is a block diagram showing an example of a schematic configuration of a vehicle control system.

FIG. 5 is a block diagram showing a schematic configuration example of the vehicle control system that is one example of a moving body control system to which the technology according to the present disclosure can be applied.

A vehicle control system 12000 includes a plurality of electronic control units connected via a communication network 12001. In the example shown in FIG. 5, the vehicle control system 12000 includes a drive system control unit 12010, a body system control unit 12020, an out-vehicle information detection unit 12030, an in-vehicle information detection unit 12040, and an integrated control unit 12050. Moreover, as a functional configuration of the integrated control unit 12050, a microcomputer 12051, a sound-and-image output unit 12052, and an in-vehicle network interface (I/F) 12053 are illustrated.

The drive system control unit 12010 controls an operation of apparatuses related to a drive system of a vehicle in accordance with various programs. For example, the drive system control unit 12010 functions as a control apparatus for a driving force generation apparatus configured to generate a driving force of the vehicle such as an internal combustion engine or a driving motor, a driving force transmission mechanism configured to transmit the driving force to wheels, a steering mechanism configured to adjust a steering angle of the vehicle, a braking apparatus configured to generate a braking force of the vehicle, and the like.

The body system control unit 12020 controls operations of various apparatuses mounted on a vehicle body in accordance with various programs. For example, the body system control unit 12020 functions as a control apparatus for a keyless entry system, a smart key system, a power window apparatus, or various lamps such as headlamps, back lamps, brake lamps, blinkers, or fog lamps. In this case, in the body system control unit 12020, radio waves that are transmitted from a portable machine to substitute for a key, or signals from various switches can be input. The body system control unit 12020 receives the input of these radio waves or signals, and controls a door lock apparatus, the power window apparatus, the lamps, and the like of the vehicle.

The out-vehicle information detection unit 12030 detects information outside the vehicle on which the vehicle control system 12000 is mounted. For example, an imaging unit 12031 is connected to the out-vehicle information detection unit 12030. The out-vehicle information detection unit 12030 causes the imaging unit 12031 to capture an image outside the vehicle, and receives the captured image. The out-vehicle information detection unit 12030 may perform object detection processing or distance detection processing with respect to a person, a car, an obstacle, a sign, or a character or the like on a road surface on the basis of the received image.

The imaging unit 12031 is an optical sensor that receives light and outputs an electrical signal corresponding to an amount of received light. The imaging unit 12031 can output the electrical signal as an image, or can output the electrical signal as distance measurement information. Moreover, the light received by the imaging unit 12031 may be visible light or non-visible light such as infrared light.

The in-vehicle information detection unit 12040 detects in-vehicle information. For example, a driver state detection unit 12041 that detects a state of a driver is connected to the in-vehicle information detection unit 12040. The driver state detection unit 12041 may include, for example, a camera that images the driver, and the in-vehicle information detection unit 12040 may calculate a fatigue degree or a concentration degree of the driver or may determine whether the driver is asleep on the basis of detection information input from the driver state detection unit 12041.

The microcomputer 12051 can arithmetically operate a control target value of the driving force generation apparatus, the steering mechanism, or the braking apparatus on the basis of the in-vehicle and out-vehicle formation acquired by the out-vehicle information detection unit 12030 or the in-vehicle information detection unit 12040, and can output a control command to the drive system control unit 12010. For example, the microcomputer 12051 can perform cooperative control that aims at realization of functions of an advanced driver assistance system (ADAS) including collision avoidance or impact mitigation of the vehicle, following traveling based on an inter-vehicle distance, vehicle speed maintaining traveling, vehicle collision warning, or vehicle lane departure warning, and the like.

Moreover, the microcomputer 12051 controls the driving force generation apparatus, the steering mechanism, the braking apparatus, or the like on the basis of the information around the vehicle acquired by the out-vehicle information detection unit 12030 or the in-vehicle information detection unit 12040, by which the cooperative control aiming at automatic driving or the like that enables autonomous traveling without depending on a manipulation of the driver.

Moreover, the microcomputer 12051 can output a control command to the body system control unit 12020 on the basis of the out-vehicle information acquired by the out-vehicle information detection unit 12030. For example, the microcomputer 12051 controls headlamps in accordance with a position of a preceding vehicle or an oncoming vehicle sensed by the out-vehicle information detection unit 12030, and performs the cooperative control that aims at performing prevention of glare such as switching from a high beam to a low beam.

The sound-and-image output unit 12052 transmits at least one output signal of sound or an image to an output apparatus capable of visually or audibly notifying a vehicle occupant or a vehicle exterior of the information. In the example of FIG. 5, an audio speaker 12061, a display unit 2062, and an instrument panel 12063 are illustrated as output apparatuses. A display unit 12062 may include, for example, at least one of an on-board display or a head-up display.

Figure 6:
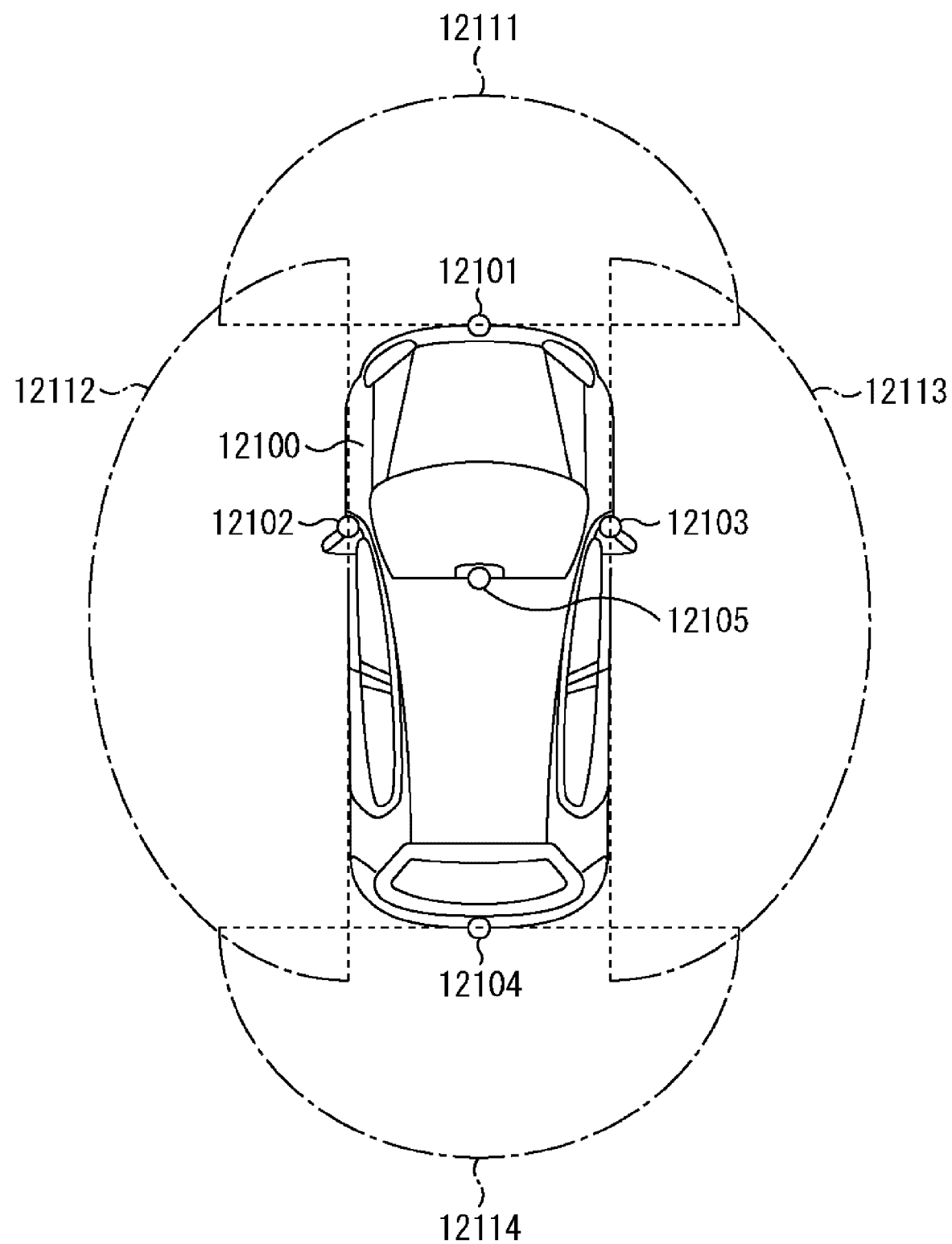
FIG. 6 is an explanatory diagram showing one example of installation positions of an out-vehicle information detection unit and an imaging unit.

FIG. 6 is a diagram showing an example of an installation position of the imaging unit 12031.

In FIG. 6, the imaging unit 12031 has imaging units 12101, 12102, 12103, 12104, 12105.

The imaging units 12101, 12102, 12103, 12104, 12105 are provided, for example, at positions such as a front nose, side mirrors, a rear bumper, a back door, and an upper portion of a windshield in a vehicle interior and the like of a vehicle 12100. The imaging unit 12101 provided in the front nose and the imaging unit 12105 provided in the upper portion of the windshield in the vehicle interior mainly acquire images in front of the vehicle 12100. The imaging units 12102, 12103 provided in the side mirror mainly acquire images on sides of the vehicle 12100. The imaging unit 12104 provided in the rear bumper or the back door mainly acquires an image behind the vehicle 12100. The imaging unit 12105 provided in the upper portion of the windshield in the vehicle interior is mainly used for detection of a preceding vehicle or a pedestrian, an obstacle, a traffic signal, a traffic sign, a lane, or the like.

Note that FIG. 6 shows an example of imaging ranges of the imaging units 12101 to 12104. An imaging range 12111 indicates the imaging range of the imaging unit 12101 provided in the front nose, the imaging ranges 12112, 12113 indicate the imaging ranges of the imaging units 12102, 12103 provided in the side mirrors, respectively, and an imaging range 12114 indicates the imaging range of the imaging unit 12104 provided in the rear bumper or the back door. For example, by superimposing image data captured by the imaging units 12101 to 12104, an overhead image when the vehicle 12100 is viewed from above is obtained.

At least one of the imaging units 12101 to 12104 may have a function of acquiring distance information. For example, at least one of the imaging units 12101 to 12104 may be a stereo camera configured of a plurality of imaging elements, or may be an imaging element having pixels for phase difference detection.

For example, the microcomputer 12051 finds a distance to each solid object inside the imaging ranges 12111 to 12114 and temporal change of the distance (relative speed with respect to the vehicle 12100) on the basis of the distance information obtained from the imaging units 12101 to 12104, by which particularly, a solid object that is the nearest solid object on a traveling path of the vehicle 12100 and is traveling at a predetermined speed (for example, 0 km/h or higher) in substantially the same direction as the vehicle 12100 can be extracted as a preceding vehicle. Further, the microcomputer 12051 can preset an inter-vehicle distance to be secured between the preceding vehicle and itself, and can perform automatic brake control (including follow-up stop control), automatic acceleration control (including follow-up start control), or the like. Thus, the cooperative control aiming at automatic driving or the like that enables autonomous traveling without depending on the manipulation of the driver can be performed.

For example, the microcomputer 12051 can classify solid object data related to a solid object into a two-wheeled vehicle, an ordinary vehicle, a large vehicle, a pedestrian, and another solid object such as a power pole on the basis of the distance information obtained from the imaging units 12101 to 12104 and extract them to use them for automatic avoidance of the obstacles. For example, the microcomputer 12051 identifies an obstacle around the vehicle 12100 as an obstacle that the driver of the vehicle 12100 can visually recognize and an obstacle that is difficult for the driver of the vehicle 12100 to visually recognize. In addition, the microcomputer 12051 determines a collision risk indicating a risk of collision with each obstacle, and in a situation where the collision risk is equal to or higher than a set value and there is a possibility of collision, the microcomputer 12051 can perform driving assistance for collision avoidance by outputting an alarm to the driver via the audio speaker 12061 and the display unit 12062, or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not the pedestrian is present in the captured images of the imaging units 12101 to 12104. Such pedestrian recognition is performed, for example, by a procedure of extracting characteristics in the captured images of the imaging units 12101 to 12104 as the infrared cameras, and a procedure of performing pattern matching processing to a series of characteristics indicating a contour of an object to determine whether or not the object is a pedestrian. If the microcomputer 12051 determines that there is a pedestrian in the captured images of the imaging units 12101 to 12104 and recognizes the pedestrian, the sound-and-image output unit 12052 controls the display unit 12062 so as to display a square contour line in a superimposed manner on the recognized pedestrian for emphasis. Moreover, the sound-and-image output unit 12052 may control the display unit 12062 so as to display an icon or the like indicating a pedestrian at a desired position.

In the moving body control system configured as described above, the imaging unit 12031 acquires a captured image and the depth information. Moreover, in a case where the imaging unit 12031 cannot acquire the depth information, the out-vehicle information detection unit 12030 is provided with a surrounding information detection sensor capable of acquiring the depth information. As a surrounding information detection sensor, a time of flight (TOF) sensor, a light detection and ranging/laser imaging detection and ranging (LIDAR) sensor, or the like is used. The out-vehicle information detection unit 12030 outputs the captured image and the depth information acquired from the imaging unit 12031 or the captured image acquired from the imaging unit 12031 and the depth information acquired by the surrounding information detection sensor to the integrated control unit 12050.

The integrated control unit 12050 is provided with the functions of the transmittance estimation unit 31 and the transmittance detection unit 32, and the transmittance is estimated and detected as described above to generate the transmittance map. Moreover, the body system control unit 12020 is provided with the operation control unit 33.

The body system control unit 12020 performs lamp drive control of a controlled unit, for example, the fog lamps on the basis of the transmittance map generated by the integrated control unit 12050.

The body system control unit 12020 performs lighting control as the lamp drive control. The presence or absence of the haze is determined with respect to an entire or partial region of the transmittance map. The partial region may be each divided region when the entire transmittance map is divided into a plurality of regions, or may be one or a plurality of regions set with a predetermined region size at a preset position in the transmittance map.

The body system control unit 12020 compares an average value of the entire or partial region of the transmittance map with a threshold value, and determines whether there is a partial region where the average value of the transmittance is lower than the predetermined threshold value or the transmittance is lower than a predetermined threshold value. Moreover, the operation control unit 33 detects pixels whose transmittance is lower than a predetermined threshold, and determines whether a detected number of pixels is larger than a predetermined threshold in the entire transmittance map, or whether there is a partial region where the detected number of pixels is larger than a predetermined threshold value. The body system control unit 12020, for example, puts the fog lamps into a lighting state in a case where the transmittance average value of the entire transmittance map is lower than the predetermined threshold value, and puts the fog lamps into a non-lighting state in a case where it is not lower than the predetermined threshold value. Moreover, the body system control unit 12020, for example, puts the fog lamps into the lighting state in a case where the number of pixels whose transmittance is lower than the predetermined threshold is larger than the predetermined threshold value in the entire transmittance map, and puts the fog lamps into the non-lighting state in a case where the number of the relevant pixels is not lower than the predetermined threshold value.

The body system control unit 12020 may further perform light distribution control as the lamp drive control. For example, in a case where the body system control unit 12020 detects the partial region where the transmittance average value is lower than the predetermined threshold value, the body system control unit 12020 performs the light distribution control by putting the fog lamps into the lighting state, and performs irradiation of light in a direction of the partial region where the transmittance average value is lower than the predetermined threshold value or at an irradiation angle corresponding to the partial region. Moreover, the body system control unit 12020 puts the fog lamps into the non-lighting state in a case where the partial region where the transmittance average value is lower than the predetermined threshold value is not detected. Moreover, the body system control unit 12020 performs the light distribution control by putting the fog lamps into the lighting state in a case where the partial region where the number of pixels whose transmittance is lower than the predetermined threshold value is larger than the predetermined threshold value is detected, and performs the irradiation of the light in the direction of this partial region and at the irradiation angle corresponding to the partial region. Moreover, the body system control unit 12020 puts the fog lamps into the non-lighting state in a case where the partial region where the number of pixels whose transmittance is lower than the predetermined threshold is larger than the predetermined threshold value is not detected.

Further, the body system control unit 12020 may further perform light amount control as the lamp drive control. The body system control unit 12020 controls the light amount by putting the fog lamps into the lighting state in a case where the transmittance average value of the entire or partial region of the transmittance map is lower than the predetermined threshold value, and the light amount is increased as the transmittance average value decreases. Moreover, the body system control unit 12020 puts the fog lamps into the non-lighting state in a case where the average transmittance value is not lower than the predetermined threshold value.

In this way, since the moving body control system performs the lamp drive control on the basis of the detected transmittance, for example, when the fog is dense, the fog lamps can be automatically lighted, and when the fog becomes clear, the fog lamps can be automatically lighted off. Moreover, the irradiation direction and the irradiation angle of the fog lamps are automatically adjusted, and the visibility of the region where the fog is dense can be improved. Further, a light amount of the fog lamps can be automatically adjusted to an optimum light amount in accordance with a fog density. Note that the fog lamps may be provided not only in the front of the vehicle but also in the rear of the vehicle.

Moreover, the lamp drive control is not limited to the drive control of the fog lamps. For example, if the headlamps are directed upward (high beam) when the fog is dense, the forward visibility is reduced. Accordingly, when the fog is dense, control to direct the headlamps downward (low beam) or the control to reduce the light amount may be automatically performed.

Moreover, the control apparatus of the present technology may be applied not only to an automobile but also to a ship, a flying body or the like as long as it is mobile equipment used in an environment where the haze occurs. Moreover, in the operation control based on the detected transmittance, the detected transmittance may be output to an outside. For example, it is applied to an unmanned flying body such as a drone, and imaging is performed from the sky to detect the transmittance during the imaging. Moreover, in a case where the transmittance falls below a threshold value, the unmanned flying body notifies the control side and the like of the detected transmittance. Performing the above-described operation control enables an occurrence situation of the haze to be observed from the sky with high accuracy. Moreover, movement direction may be controlled as the operation control based on the detected transmittance. For example, the unmanned flying body automatically performs the imaging by notifying the control side of the transmittance detected for each of the regions, or while automatically selecting a flight route in a direction with less haze on the basis of the transmittance detected for each of the regions.

<4. Configuration and Operation of Image Processing Apparatus>

Figure 7:
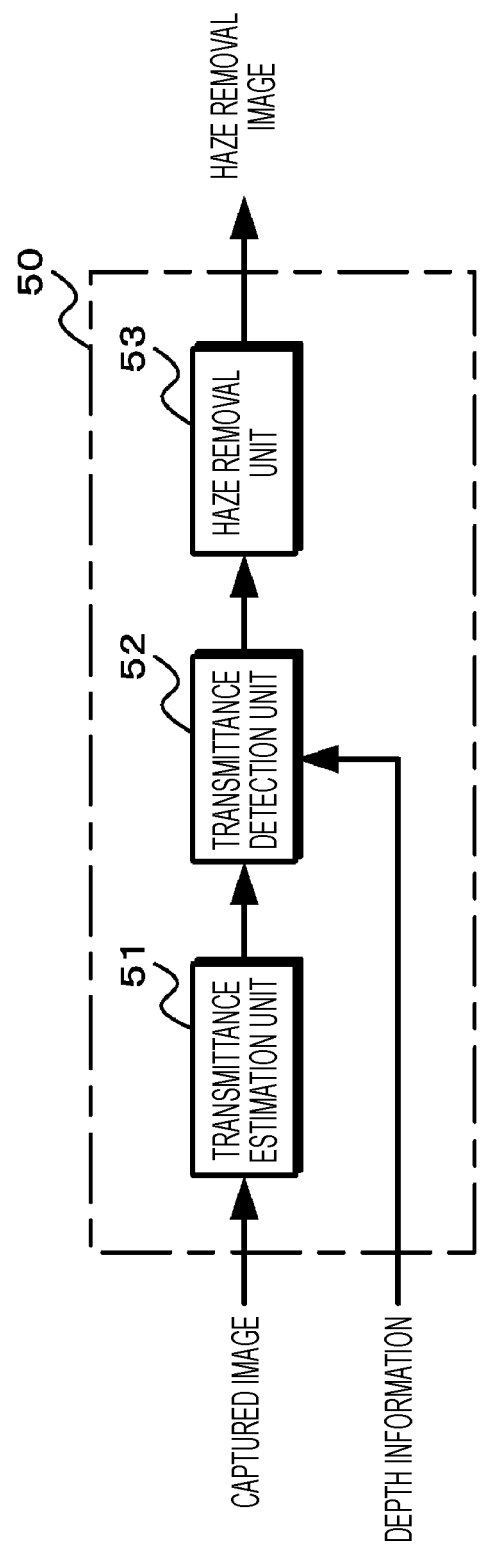
FIG. 7 is a diagram illustrating a configuration of an image processing apparatus.

Next, an image processing apparatus of the present technology will be described. FIG. 7 illustrates a configuration of the image processing apparatus. An image processing apparatus 50 has a transmittance estimation unit 51, a transmittance detection unit 52, and a haze removal unit 53.

The transmittance estimation unit 51 performs processing similar to the above-described transmittance estimation unit 11, for example, estimates the transmittance for each pixel from the captured image, and outputs the resultant to the transmittance detection unit 32. The transmittance detection unit 52 performs processing similar to the above-described transmittance detection unit 12, and uses the transmittance estimated by the transmittance estimation unit 31 and, for example, the depth information for each pixel to detect the transmittance of the haze at the time of imaging of the captured image, and outputs the transmittance map indicating the transmittance for each pixel to the haze removal unit 53. The haze removal unit 53 removes the haze from the captured image acquired by the imaging apparatus on the basis of the transmittance map output from the transmittance detection unit 52.

In a first operation of the haze removal unit 53, the haze is removed by adjusting contrast in accordance with a reciprocal of the transmittance $t_a(x)$ of each pixel indicated by the transmittance map. In this case, the haze removal unit 53 sets, as a DC component IDC of a processing target pixel, the average pixel value of pixels (including the processing target pixel) in a vicinity region with the processing target pixel as a reference. Moreover, the haze removal unit 53 sets, as a contrast component IAC of the processing target pixel, an average value of pixel value differences between the processing target pixel and each of the other pixels in the vicinity region. Further, the haze removal unit 53 performs arithmetic operation of an expression (9), using a DC component $IDC(x)$, a contrast component $IAC(x)$, and the transmittance $t_a(x)$ at the pixel position x that is the processing target pixel to calculate the pixel value after the haze removal, that is, a scene radiation $J(x)$. The haze removal unit 53 performs arithmetic operation of the expression (9) for each pixel, and restores a clear captured image with the haze removed.

$$J(x)=IDC(x)+(1/t_a(x))IAC \qquad (9)$$

In a second operation of the haze removal unit 53, the haze is removed on the basis on a model of the transmittance, using the captured image and the detected transmittance. By transforming the expression (1) representing the model of the transmittance, an expression (10) for calculating the scene radiation $J(x)$ is obtained. Accordingly, the haze removal unit 53 performs the arithmetic operation of the expression (10) for each pixel and restores a clear captured image with the haze removed.

$$J(x)=(I(x)-A))/t_a(x)+A \qquad (10)$$

Note that the transmittance $t_a(x)$ may take a value close to "0", and if the transmittance $t_a(x)$ has a value close to "0", noise may be noticeable in the captured image with the haze removed. Accordingly, a lower limit value t0 may be set in advance, and if the transmittance $t_a(x)$ is smaller than the lower limit value t0, the haze removal may be performed, using the lower limit value t0.

For example, as described above, the haze removal unit 53 sets the pixel having the highest luminance in the captured image as the ambient light A to be used in the expression (10). Moreover, the haze removal unit 53 may use, as the ambient light A, the average value of the entire captured image or a partial region thereof acquired from the imaging apparatus. Moreover, the haze removal unit 53 may estimate the ambient light A by principal component analysis or by independent component analysis. For example, by using the respective three primary color components as respective three-dimensional vector, and using the respective color components of the pixel values of the entire or partial region of the captured image acquired from the imaging apparatus as corresponding norms, the haze removal unit 53 performs the principal color component of three-dimensional vectors based on the pixel values of the entire captured image or the partial region thereof, and sets principal component vectors obtained as the ambient light A. Moreover, assuming that the pixel value $I(x)$, the scene radiation $J(x)$, and the transmittance $t(x)$ of each pixel are independent, the haze removal unit 53 performs the independent component analysis, using the pixel values of the entire captured image or a partial region thereof acquired from the imaging apparatus, and estimates the ambient light A that satisfies the relationship of the expression (1) for each pixel.

In this manner, in the image processing apparatus, the transmittance of the haze at the time of imaging of the captured image is detected, using the transmittance estimated for each of the regions from the captured image, and the depth information for each of the regions, and the removal of the haze is performed on the basis of the above-described detected transmittance. For this reason, as compared with a case where the removal of the haze is performed on the basis of the transmittance estimated from the captured image, it is possible to remove the haze more with high accuracy and restore a clear captured image.

Moreover, if the image processing apparatus of the present application is used for electronic equipment used in an environment where haze occurs, for example, a monitoring apparatus, a clear captured image can be obtained even if the haze occurs in a monitoring target region, which can prevent decrease in monitoring capability. Moreover, if the image processing apparatus of this application is used for the above-mentioned vehicle control system, a clear captured image with the haze removed can be obtained even if the haze occurs when the vehicle is traveling. Accordingly, if a surrounding environment is monitored, using the captured image with the haze removed, an obstacle and the like can be easily detected even if the haze occurs. Moreover, displaying captured images with the haze removed on the head-up display, a back monitor, an electronized rearview mirror, door mirrors, and the like of the display unit 12062 allows the driver to easily grasp a peripheral situation even if the haze occurs.

The transmittance detection operation described in the specification, the control operation based on the detected transmittance, and the haze removal operation based on the detected transmittance can be executed by hardware, software, or a configuration obtained by combining both. In a case where processing by software is executed, a program on which a processing sequence is recorded is installed in a memory in a computer incorporated in dedicated hardware, and is executed. Alternatively, the program can be installed and executed on a general-purpose computer capable of executing various processing.

For example, the program can be recorded in advance on a hard disk, a solid state drive (SSD), or a read only memory (ROM) as a recording medium. Alternatively, the program can be temporarily or permanently stored in (recorded on) a removable recording medium such as a flexible disk, a compact disc read only memory (CD-ROM), a magneto optical (MO) disk, a digital versatile disc (DVD), a Blu-ray disc (BD (registered trademark)), a magnetic disk, or a semiconductor memory card. Such a removable recording medium can be provided as so-called package software.

Moreover, in addition to installing the program from the removable recording medium to the computer, the program may be transferred from the download site to the computer wirelessly or by wire via a network such as a local region network (LAN) or the Internet. The computer can receive the program transferred in this way and install it on a recording medium such as a built-in hard disk.

Note that the effects described in this specification is illustrative and is not limited, and there may be an additional effect that is not described. Moreover, the present technology should not be construed as being limited to the embodiments of the technology described above. The embodiments of this technology disclose the present technology in the form of examples, and it is obvious that those skilled in the art can make modifications and substitutions of the embodiments without departing from the gist of the present technology. In other words, the scope of the claims should be considered in order to determine the gist of the present technology.

Moreover, the control apparatus of the present technology can also take the following configurations.

(1) A control apparatus including:
a transmittance detection unit that detects a transmittance of haze at the time of imaging of a captured image, using a transmittance estimated for each of regions from the captured image, and depth information for each of the regions; and
an operation control unit that performs operation control on the basis of the transmittance detected by the transmittance detection unit.

(2) The control apparatus according to (1), in which the operation control unit performs lamp drive control on the basis of the transmittance detected by the transmittance detection unit.

(3) The control apparatus according to (2), in which the operation control unit performs lighting control on the basis of the transmittance detected by the transmittance detection unit.

(4) The control apparatus according to any of (2) or (3), in which the operation control unit performs light amount control on the basis of the transmittance detected by the transmittance detection unit.

(5) The control apparatus according to any of (2) to (4), in which the operation control unit controls at least any of an irradiation direction or an irradiation angle of light on the basis of the transmittance for each of the regions detected by the transmittance detection unit.

(6) The control apparatus according to any of (2) to (5), in which the operation control unit performs lamp drive control of a fog lamp.

(7) The control apparatus according to any of (1) to (6), in which the operation control unit performs control to output the detected transmittance to an outside on the basis of the transmittance detected by the transmittance detection unit.

(8) The control apparatus according to (1), in which the operation control unit controls movement operation on the basis of the transmittance for each of the regions detected by the transmittance detection unit.

INDUSTRIAL APPLICABILITY

In the information processing apparatus and the information processing method, and the control apparatus and the image processing apparatus of this technology, the transmittance of the haze at the time of imaging of the captured image is detected, using the transmittance estimated for each of the regions from the captured image and the depth information for each of the regions. This enables the transmittance to be detected with high accuracy. Accordingly, this technology is suitable for mobile equipment and electronic equipment used in an environment where haze occurs.

REFERENCE SIGNS LIST

10 Information processing apparatus
11, 31, 51 Transmittance estimation unit
12, 32, 52 Transmittance detection unit
13 Smoothing unit
30 Control apparatus
33 Operation control unit
50 Image processing apparatus
53 Haze removal unit

The invention claimed is:

1. An information processing apparatus comprising
a transmittance detection unit configured to
detect a transmittance of haze at a time of imaging of a captured image, using a transmittance estimated for each of regions from the captured image, and depth information for each of the regions,
perform grayscale conversion that causes a grayscale of a depth indicated by the depth information for each of the regions to correspond to a grayscale of the estimated transmittance, and
set the depth after the grayscale conversion as the transmittance of the haze,
wherein the transmittance detection unit is implemented via at least one processor.

2. The information processing apparatus according to claim 1, wherein
the transmittance detection unit is further configured to detect the transmittance of the haze on a basis of a logarithm average value of the estimated transmittances and an average value of depths indicated by the depth information in a whole or a predetermined portion of the captured image.

3. The information processing apparatus according to claim 2, wherein
the transmittance detection unit is further configured to
calculate an atmospheric scattering coefficient at the time of imaging on the basis of the logarithm average value of the estimated transmittance and the average value of the depths, and
detect the transmittance of the haze on a basis of the atmospheric scattering coefficient and the depth information.

4. The information processing apparatus according to claim 1, wherein
in the grayscale conversion, a histogram obtained by normalizing the depth indicated by the depth information is caused to correspond to a histogram of the estimated transmittance.

5. The information processing apparatus according to claim 1, wherein
the region is a region of one pixel or a plurality of pixels provided continuously or at a predetermined pixel interval.

6. An information processing method comprising
detecting a transmittance of haze at a time of imaging of a captured image, using a transmittance estimated for each of regions from the captured image, and depth information for each of the regions,
performing grayscale conversion that causes a grayscale of a depth indicated by the depth information for each of the regions to correspond to a grayscale of the estimated transmittance, and setting the depth after the grayscale conversion as the transmittance of the haze.

7. A control apparatus comprising:

a transmittance detection unit configured to detect a transmittance of haze at a time of imaging of a captured image, using a transmittance estimated for each of regions from the captured image, and depth information for each of the regions, perform grayscale conversion that causes a grayscale of a depth indicated by the depth information for each of the regions to correspond to a grayscale of the estimated transmittance, and set the depth after the grayscale conversion as the transmittance of the haze; and an operation control unit configured to perform operation control on a basis of the transmittance detected by the transmittance detection unit, wherein the transmittance detection unit and the operation control unit are each implemented via at least one processor.

8. The control apparatus according to claim 7, wherein the operation control unit is further configured to perform lamp drive control on the basis of the transmittance detected by the transmittance detection unit.

9. The control apparatus according to claim 8, wherein the operation control unit is further configured to perform lighting control on the basis of the transmittance detected by the transmittance detection unit.

10. The control apparatus according to claim 8, wherein the operation control unit is further configured to perform light amount control on the basis of the transmittance detected by the transmittance detection unit.

11. The control apparatus according to claim 8, wherein the operation control unit is further configured to control at least any of an irradiation direction or an irradiation angle of light on a basis of the transmittance for each of the regions detected by the transmittance detection unit.

12. The control apparatus according to claim 8, wherein the operation control unit is further configured to perform lamp drive control of a fog lamp.

13. The control apparatus according to claim 7, wherein the operation control unit is further configured to perform control to output the detected transmittance to an outside on the basis of the transmittance detected by the transmittance detection unit.

14. The control apparatus according to claim 7, wherein the operation control unit is further configured to control movement operation on a basis of the transmittance for each of the regions detected by the transmittance detection unit.

15. An image processing apparatus comprising:

a transmittance detection unit configured to detect a transmittance of haze at a time of imaging of a captured image, using a transmittance estimated for each of regions from the captured image, and depth information for each of the regions, perform grayscale conversion that causes a grayscale of a depth indicated by the depth information for each of the regions to correspond to a grayscale of the estimated transmittance, and set the depth after the grayscale conversion as the transmittance of the haze; and a haze removal processing unit configured to generate an image with the haze removed from the captured image on a basis of the transmittance detected by the transmittance detection unit, wherein the transmittance detection unit and the haze removal processing unit are each implemented via at least one processor.

16. The image processing apparatus according to claim 15, wherein the haze removal processing unit is further configured to adjust contrast in accordance with a reciprocal of the detected transmittance to generate the image with the haze removed.

17. The image processing apparatus according to claim 15, wherein the haze removal processing unit is further configured to generate the image with the haze removed on a basis of a transmittance model, using the captured image and the detected transmittance.

* * * * *